United States Patent [19]
Engle

[11] Patent Number: 5,494,342
[45] Date of Patent: Feb. 27, 1996

[54] ELECTROPNEUMATIC BRAKE CONTROL SYSTEM

[75] Inventor: Thomas H. Engle, Cape Vincent, N.Y.

[73] Assignee: New York Air Brake Corporation, Watertown, N.Y.

[21] Appl. No.: 260,376

[22] Filed: Jun. 14, 1994

[51] Int. Cl.⁶ .................................................. B60T 13/68
[52] U.S. Cl. ........................ 303/3; 303/7; 303/15; 303/20; 303/81
[58] Field of Search ............... 303/3, 15, 7, 20, 303/60, 81, 82, 38, 39, 40

[56] References Cited

U.S. PATENT DOCUMENTS

| | | |
|---|---|---|
| 3,910,639 | 10/1975 | Engle ........................... 303/15 X |
| 4,052,110 | 10/1977 | Banker . |
| 4,076,322 | 2/1978 | Banker et al. . |
| 4,402,047 | 8/1983 | Newton et al. . |
| 4,555,766 | 11/1985 | Wright . |
| 4,598,953 | 7/1986 | Wood et al. . |
| 4,702,291 | 10/1987 | Engle . |
| 4,799,741 | 1/1989 | Engle ........................... 303/60 |
| 5,020,862 | 6/1991 | Balukin et al. ............... 303/15 |
| 5,056,873 | 6/1991 | Deno et al. ................. 303/20 X |
| 5,222,788 | 6/1993 | Dimsa et al. ................ 303/15 |

Primary Examiner—Robert J. Oberleitner
Assistant Examiner—Lee W. Young
Attorney, Agent, or Firm—Barnes & Thornburg

[57] ABSTRACT

A braking system including a brakepipe control valve which controls pressure on a brakepipe in response to braking pressure signal from an electropneumatic converter. An electropneumatic cutoff valve connects the control valve to the brake pipe. A controller controls the converter and cutoff valve. A parking brake system and retarder control system are also included and are controlled by the controller.

17 Claims, 3 Drawing Sheets

ELECTROPNEUMATIC BRAKE CONTROL SYSTEM

BACKGROUND AND SUMMARY OF THE INVENTION

The present invention relates generally to an improved train brake system and more specifically to an electropneumatic brake system for integral trains.

An integral train is a train on which the motive power and carrying units are integrated into a single unit, with systems shared between subunits. It is distinct from a conventional train in that it does not require that motive power be utilized into a separable locomotive, and that carrying parts of the train are not required to be switchable in freight yards nor to be capable of exchange between trains. One example of an integral train is the Iron Highway—a train consisting of one or more elements. Each element composed of integrated power and carrying platforms with a control cab at each end of the element. Each element consists of one or two power cabs and a fixed number of platforms. The platforms and power cabs are articulated together in order to both reduce the normal slack between the cars and provide a continuous flat deck over the length of the continuous platform. The reduction of the slack results in a corresponding reduction in the dynamic forces which the cars are required to withstand during the run in and out of the train slack. The reduction of the dynamic forces and elimination of switchyard impacts allows for the use of lighter cars, which allows for an increase in the cargo weight for a given overall train weight and therefore an increase in train efficiency. Additional improvements in efficiency are obtained through the truck design and from other sources.

An example of an integral train is described in my prior U.S. Pat. No. 4,702,291. Because of this unique design of integral trains, there exists an opportunity to design a brake control system without the limitation of standard freight brakes. The system should include the ability to control the brakes throughout the integral train, provide control of a retarder for the propulsion transmission, operate on the parking brakes as well as provide the appropriate operation during an emergency towing by a conventional locomotive.

One example of a computerized brake control system is U.S. Pat. No. 4,402,047 to Newton et al. This is an electropneumatic system which uses transducers and a feedback loop to control the brakes of a single vehicle which in this case is generally the locomotive of a conventional train. The controller of this system uses pressure signal feedbacks to the computer which compares these to a target and makes fine corrections to an output device to provide variations of the signal to maintain the appropriate brake pressure in a brake cylinder. Other examples of electropneumatic brake systems and electrically assisted application and release for fluid pressure brake systems, for example, U.S. Pat. Nos. 4,052,110 and 4,076,322.

Thus, it is an object of the present invention to provide an improved brake control system for integral trains.

It is another object of the present invention to provide an electropneumatic brake control system which will control the brakepipe and parking brakes.

It is another object of the present invention to provide an electropneumatic control system which will permit simultaneous brakepipe reduction and restoration at a number of points along a train.

It is a further object of the present invention to provide a brake control system which controls the brakepipe, a parking brake and a propulsion transmission retarder.

A still further object of the present invention is to provide a brake control system which can be used with a conventional locomotive during an emergency tow.

These and other objects are achieved by a system including a control valve for controlling pressure on the brakepipe in response to a brake control signal, a cut-off valve connecting the control valve to the brakepipe and a converter for converting digital values of electric brake signals to discreet pneumatic brake control signals for the control valve. A controller provides the digital electric brake signals for controlling brakepipe pressure. The converter valve is a pilot valve having a plurality of solenoids responsive to the digital values. This allows accurate repeatable control and produces the discreet pneumatic brake control signals. The unique converter, in response to digital signals, allows the appropriate control of the brakepipe pressure without the need for any electronic feedback signals. The control valve includes a first pressure sensitive element responsive to a first pressure signal to maintain the brakepipe at a fixed first pressure value and a second pressure responsive element responsive to the pneumatic brake control signal from the converter to reduce pressure in the brakepipe to values which are discreet fractions below the first value. The first pressure sensitive element compares brakepipe to the first pressure signal and the second pressure sensitive element is connected to the first pressure element and reduces the effect of the first pressure signal in response to the pneumatic brake control signal. A feeder valve determines the first pressure signal. The pneumatic brake control signal varies in a range from zero to the first pressure signal and a ratio of the response of the first and second pressure sensitive elements defines the brakepipe service braking pressure range.

For integral trains, the electropneumatic brake control system includes at least two brakepipe control systems, each including a control valve, a cut-off valve, a converter valve and a controller. The second brakepipe control system may include transducers for sensing the first pressure signal provided to its control valve as a reference and the brakepipe pressure. The controller of the second system, and further systems on the common brakepipe which are the trailing or slave systems, closes its cut-off valve at a difference between the measured first pressure signal and measured brakepipe pressure. This prevents the second brakepipe control system from attempting to charge the brakepipe while the lead or master or first brakepipe control system is attempting to reduce the pressure in the brakepipe control system.

Each system includes an electropneumatic emergency vent valve connected to the brakepipe and the controller controls the cut-off valve to close and controls the electropneumatic emergency vent valve to open for an emergency braking. Also, a pneumatic emergency vent valve is connected in response to an emergency brakepipe pressure in the brakepipe to vent the brakepipe. A transducer senses an emergency brakepipe pressure in the brakepipe and the controller controls the cut-off valve and the electropneumatic emergency vent valve in response to an emergency input from the transducer or an emergency input from an operator.

This system also includes a pneumatic parking brake system responsive to brakepipe pressure for applying and releasing a parking brake so that parking brake will be automatically released by a towing locomotive, but not be applied at any time by the controller as during normal operation. An electropneumatic parking brake valve is connected to the parking brake by the pneumatic parking brake valve and is controlled by the controller to apply and release the parking brake. The system includes a retarder valve connected to a retarder control actuator on powered platforms. The controller controls the retarder valve to provide pneumatic retard signals to operate the retarder actuator to achieve dynamic braking. An interlock valve, in the pneumatic circuit of the brake cylinder, is responsive to the retarder control pipe signals to reduce the brake cylinder pressure when the wheels associated with a particular brake cylinder are being braked by the retarder. This prevents over braking and wheel slip.

Other objects, advantages and novel features of the present invention will become apparent from the following detailed description of the invention when considered in conjunction with the accompanying drawings.

DESCRIPTION OF PREFERRED EMBODIMENTS

Figure 1:
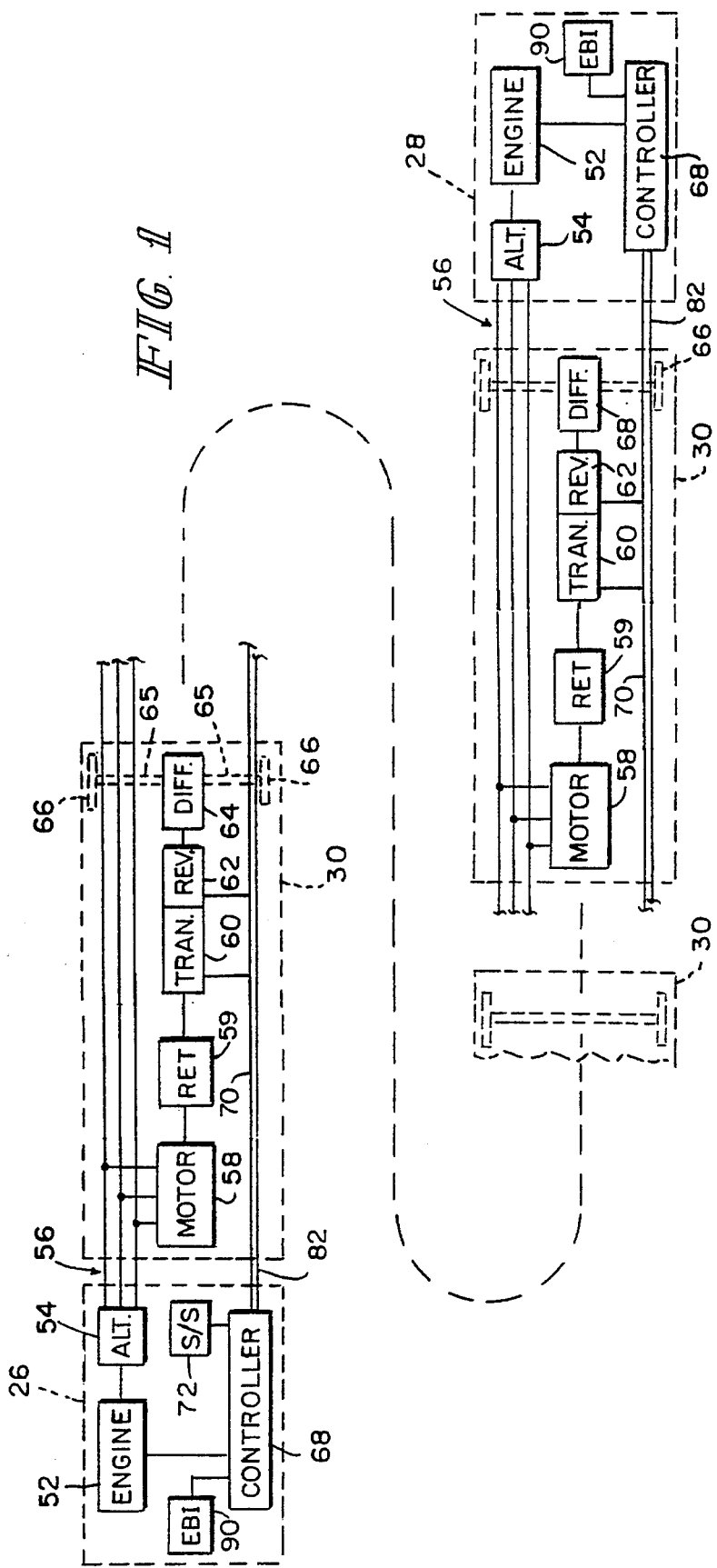
FIG. 1 is a block diagram of a propulsion system incorporating the principles of the present invention.

The electropneumatic brake control system of the present invention will be described specifically with respect to an integral train described in U.S. Pat. No. 4,702,291 which is incorporated herein by reference, but is only by way of example. The brake control system may be used in any train system. The integral train includes a plurality of train segments and each segment includes a pair of control cabs at each of the segment with a plurality of cars or platforms forming a continuous deck therebetween. As illustrated in FIG. 1, a segment is shown as having two control cabs 26 and 28 with a plurality of cars 30 there between.

The control cabs 26 and 28 are not control cabs in the conventional sense. The propulsion system 50 is considered a distributive propulsion system as illustrated in FIG. 1. The control cabs 26 and 28 include a mechanical engine 52 driving an electrical alternator 54. The output of the alternator 54 is three phase current whose frequency and voltage are a function of the speed of the engine 52. This current is transmitted down a three phase wire system 56 to a plurality of electric motors 58 distributed throughout the cars 30. Each of the electric motors 58 are connected via a hydraulic retarder 59 to a respective transmission 60 which includes a directional control reversing gear 62. The output of the directional control reversing gear drives a differential 64 to which a pair of axles 65 and wheels 66 are connected.

Each of the control cabs 26 and 28 include a controller 68 which can control the throttle position of all of the engines 52 based on a control handle position selected by the operator in one cab. The controller 68 also provides control signals via line 70 to the transmission 60 and the reversing gear 62. A train speed sensor 72 on a non-powered, non-braked axle provides an input signal to controller 68. The controller 68 selects the gears of the transmission and the shift points as a function of the measured speed of the train and the throttle setting. A communication line 82 interconnects the controller 68 on the cabs 26 and 28. The interconnection, protocol and the selection of the lead-trail relationship is described in the aforementioned patent. The controller 68 provides control signals to the pneumatic brake system through electric brake interface 90.

The system just described, other than the retarder 59, are described in the aforementioned patent and the same reference numbers and symbols are used so easy reference can be made to the details described therein. All of the elements of the present invention will have a reference number of 100 or higher.

Figure 2:
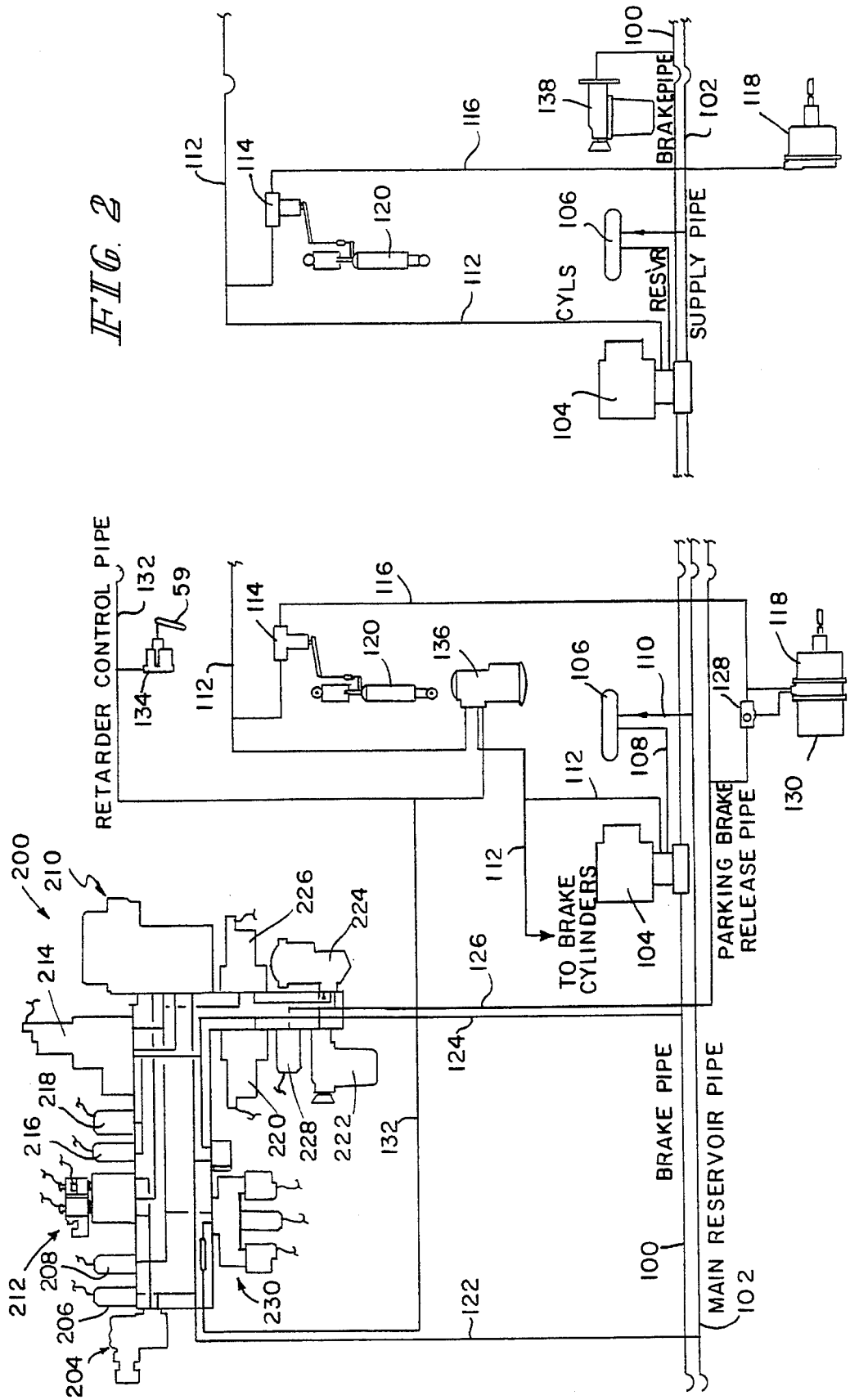
FIG. 2 is a schematic piping diagram of the brake system according to the principles of the present invention.

An electropneumatic brake control system is illustrated in FIG. 2 as including brake control system 200, the details of which will be described in FIG. 3. A brakepipe 100 and a main reservoir or supply pipe 102 run throughout the train and pneumatically interconnect the brake controls on each of the cars. Air for the main reservoir is supplied from either a compressor system or in the case of a failed local compressor, by the train line main reservoir pipe from other operative compressors in the train. In the event the train is being towed by conventional locomotive or train, air may be supplied to the system through both a connection to the locomotives main reservoir pipe and to the brakepipe 100 through a glad hand. In the event that the integral train element must be towed behind a conventional car (which has no main reservoir connection) rather than a locomotive, air from the brakepipe will charge the main reservoir system through a charging choke 240 and check valve 238 in the brakepipe control system 200 to be described with respect to FIG. 3.

A combined control and relay valve 104, for example, model KE-1 from New York Air Brake is connected to the brakepipe 100 at various cars through the train. The control and relay valve 104 need not be provided at each car and may be spaced for example, at every fourth car. A reservoir 106 is connected to the control/relay valve 104 by line 108 and is connected to the main reservoir pipe 102 by line 110. The output of the control/relay valve 104 is connected to the brake cylinders 118 by line 112, load proportioning valve 114 and line 116. A load sensing element 120 is shown connected to the proportioning valve 114.

The brake control system 200 is connected to the main reservoir pipe 102 by line 122 and to the brakepipe 100 by line 124. Line 126 connects the brake control system 200 to the parking brake 130 via a double check valve 128. The parking brake 130 is in a combined housing with the service brake applicator 118. This combined structure is a well known device such as an MGM TYPE R 3036 GT brake chamber from MGM Brakes division of Indian Head Industries, and is provided on the cars which have the propulsion units. As will be described below, the parking brake is a spring applied brake and the pressure maintains the parking brake released. The double check valve 128 holds the parking brake in its released position if the normal brakes 118 are applied from the service brake line 116 even though parking brake release line 126 may be a lower pressure.

Another output of the brake control system 200 is a retard actuator 132 connected to a lever of the retarder 59. As with the parking brake, the retarder 59 are only provided on those cars which have a propulsion component. A dynamic interlock 136 is provided between the brake line 112 and the combined control and relay valve 104 of the powered cars and is connected to the retarder control pipe 132. The retarder control signal on pipe 132 controls the interlock 136 to reduce the brake cylinder signal on line 112 of the motorized cars with an increased retarder control signal which increases dynamic braking. This coordinates the mechanical braking of the wheels with the transmission braking of the propulsion system on the motorized cars to prevent over braking and wheelslip. The non-motorized cars do not have an interlock 136. A typical interlock valve may be a H-5 relay valve available from New York Air Brake.

A vent valve 138, for example, type KM-2 available for New York Air Brake, senses a signal on the brakepipe 100 and vents the brakepipe 100 upon sensing an emergency condition. These vent valves 138 are placed throughout the train at intervals, for example, every other car.

Figure 3:
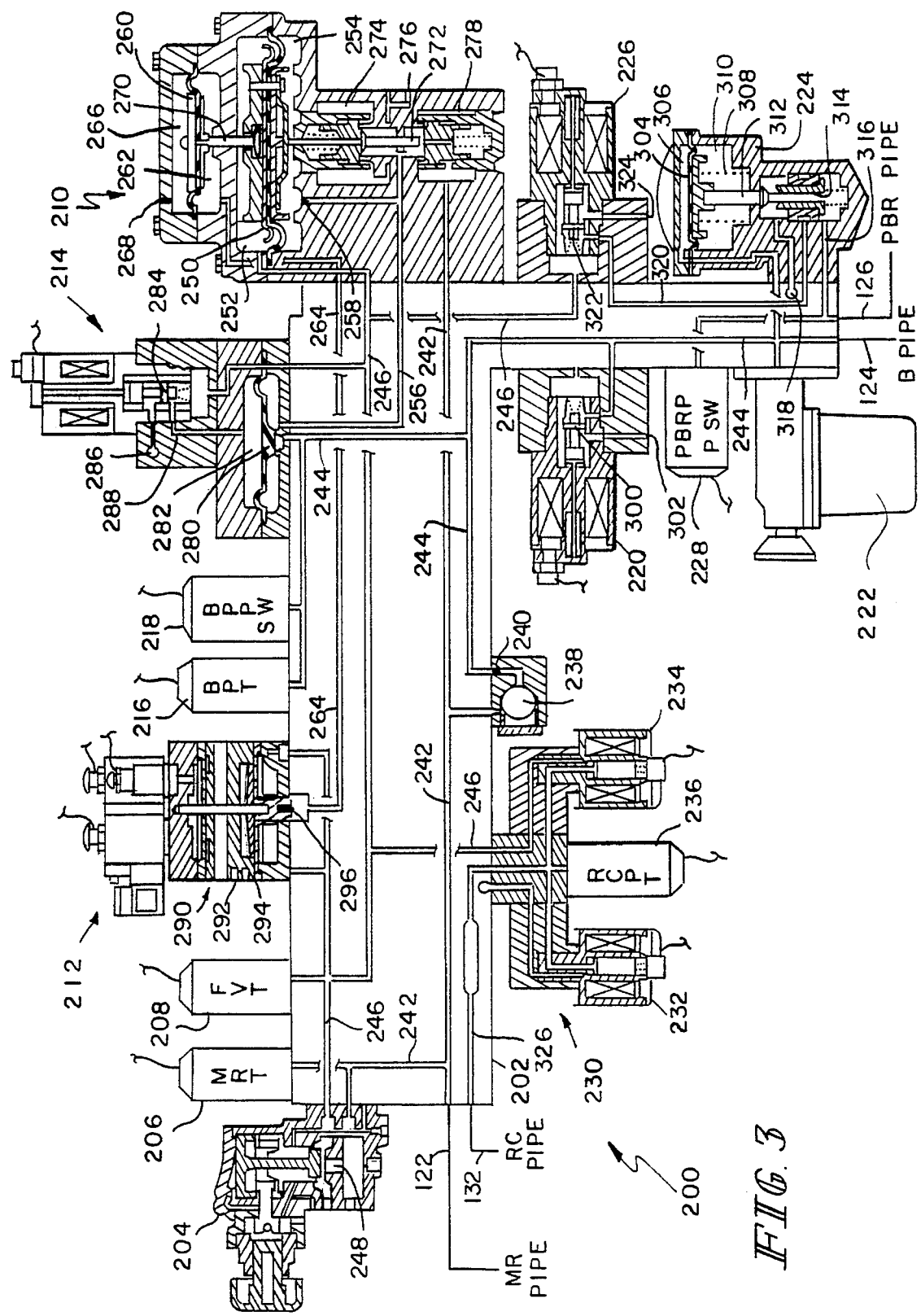
FIG. 3 is a block diagram, partial cut-away schematic of an electropneumatic brake control manifold system for application at the control ends of an element incorporating the principles of the present invention.

A brake control unit 200, combining the commanding pneumatic valves for the present system is illustrated in FIG. 3 as including a manifold 202 connected to the main reservoir pipe by line 122, retard control pipe 132, brakepipe by line 124 and parking brake release pipe 126. A feed valve 204 connected to the manifold 202 and provides a regulated pressure at brakepipe full release value to the brakepipe pressure control system and the parking brake release system. A main reservoir transducer 206 and feed valve transducer 208 are connected to the controller 68 through the brakepipe interface 90. A brakepipe control valve 210 receives a first pressure signal, which is the feed valve output, and a second pressure signal from brake signal converter 212 to control the brakepipe pressure on brakepipe line 124. The brake signal converter 212 is a electropneumatic device which converts digital values of electric brake signals from the controller 68 to discreet pneumatic brake control signals for the control valve 210. As explained in detail below, the brake signal converter 212 is a seven-step pilot valve having three solenoids which produces the second pressure signal without the necessity of feedback to the controller 68.

An electropneumatic brakepipe cut-off valve 214 connects the brakepipe control valve 210 to the brakepipe line 124. A brakepipe transducer 216 and a brakepipe pressure switch 218 are provided on the manifold and provide feedback signals to the controller 68 for use in signalling conditions to the Engineer and for operating a troubleshooting computer. As will be discussed below, the brakepipe transducer 216 and the brakepipe pressure switch 218 in combination with the brakepipe cut-off valve 214 controls the trailing or slave brakepipe control system 200 to cut-off at a pressure below that of the master or lead unit. This prevents the slave or trailing unit from attempting to charge the brakepipe while the master or lead unit is diminishing the brakepipe pressure for a brake application.

An electropneumatic emergency valve 220 is under the control of the controller 68 to electrically vent the brakepipe line 124 at all cabs in the train simultaneously. This is a backup to the all pneumatic emergency brake system. A vent valve 222 provides positive venting of the brakepipe line 124 in response to either a break-in-two or an operator initiated emergency brakepipe application on the brakepipe 100.

As previously discussed, the parking brake 130 is a spring applied, pressure released parking brake. Parking brake relay valve 224 is responsive to brakepipe pressure to provide a signal from the feed valve 204 to the parking brake release pipe 126. An electropneumatic parking brake release valve 226, under the control of the controller 68, can also control the applying and release of the parking brake pneumatically. A parking brake release pipe pressure switch 228 provides feedback to the controller 68.

A retarder control 230 is also provided on the manifold 202. It includes an electropneumatic retarder release valve 232 and an electropneumatic retard application valve 234. A retarder control pipe transducer 236 is also provided. These three elements are electrically controlled with the retarder feedback signals to the controller 68 and is used to produce four pressure levels in the retarder control pipe at, 33%, 66% and full.

A charging choke valve 238 and a charging choke 240 are also provided on the manifold 202 and connect main reservoir passage 242 and brakepipe passage 244 in the manifold 202. This allows the air supplied by a conventional locomotive which might be used to tow the train to charge the system through a gladhand to the brakepipe and to charge the main reservoir system through the charging choke 240 and choke valve 238.

The feed valve 204 connects the main reservoir pipe passage 242 and the feed valve passage 246 via feed valve seat 248. The feed valve 204 illustrated is a high capacity locomotive type feed valve for example, a type F-6, but may be an NS-1 pressure regulator. The feed valve 204 provides a regulated first pressure signal representing a brakepipe release value. The feed valve passage 246 is connected to the feed valve transducer 208 and the brake signal converter 212 and the brakepipe control valve 210.

BRAKEPIPE CONTROL

The brakepipe control valve 210 has a first pressure response member or diaphragm 250 with a feed valve chamber 252 on its topside and a brake signal chamber 254 on its bottom side. The feed valve chamber 252 is connected to feed valve passage 246 and the brake signal chamber 254 is connected to brake signal passage 256 by choke 258 and provided as an input to the brakepipe cut-off valve 214. A second pressure response member or diaphragm 260 has a brake control signal chamber 262 on its bottom side connected by a brake control signal passage 264 to the output of the brake signal converter 212 and an atmosphere chamber 266 is on the other side connected to atmosphere port 268. An interconnect mechanism 270 interconnects the second pressure responsive member 260 to the first pressure responsive member 250. Since the brake control signal chamber 262 moves the second pressure response member 260 upward, it diminishes the effect of the feed valve pressure in the feed valve chamber 252. This allows the balance of pressure responsive members at a brake signal chamber less than the feed valve chamber. Stem 272 connected to the first pressure response member 250 operates a brake application valve 274 which interconnects an atmosphere port 276 and the brake signal passage 256 and a release valve 278 which interconnects the main reservoir passage 242 and the brake signal passage 256. The brakepipe control valve 210 is a standard brakepipe control valve with the addition of the second pressure responsive member 260 and the interconnecting mechanism 270 and may be for example, a modified NY-2 available from New York Air Brake and designated NY-2B by that company.

The brakepipe signal on brakepipe signal passage 256 is connected to the brakepipe line 124 by a diaphragm valve 280 of the brakepipe cut-off valve 214. The top chamber 282 above the diaphragm 280 is controlled by a dual seat electromagnetic valve element 284 which connects the chamber 282 either to the feed valve signal on passage 246 or atmosphere port 286 via passage 288. This allows the controller 68 to electrically control the connection of the brakepipe signal from the control valve 210 to the brakepipe line 124 as will be described below.

Converter valve 212 receives the feed valve pressure 246 at its inputs and provides at its output 264 a specific percentage value of the supply or feed valve pressure as a brake control signal to the brake control signal chamber 262 of the control valve 210. Three solenoids on the converter vane 212 control the inputs to three diaphragms 290, 292 and 294 which are ratioed to provide the desired progression. These diaphragms are interconnected mechanically to each other and vane 296 to be balanced against the feed vane pressure on passage 246 to provide the digital signal on the brake control signal line passage 264. The converter valve 212 is a well known valve, for example, a seven-step pilot valve, model KBR XI-T from Knorr Bremse AG.

The electropneumatic emergency valve 220 has a solenoid valve element 300 which interconnects an atmosphere port 302 to the brakepipe passage 244 to vent the brakepipe to cause an emergency condition under the control of the controller 68.

The brakepipe control operates as follows:
CHARGING (Leading Cab)

When the driver on the leading cab calls for brakes released, the brakepipe cut-off valve 214 is energized, and all three pilot solenoids on the converter valve 212 are deenergized. Thus flow from the brakepipe control valve 210 to brakepipe line 124 is unrestricted. No air, however, is provided to the reduction or brake control signal chamber 262 of the control valve 210.

Feed valve air on passage 246 is, however, provided to the top chamber 252 of the large control diaphragm 250 forcing it downward and opening the release valve 278. This action allows air from main reservoir passage 242 to pass into the output chamber of the control valve and supply the brakepipe line 126 while at the same time entering the chamber 254 beneath the large control diaphragm 250 urging it upward. When brakepipe pressure rises to equal the value of the feed valve pressure on top of the diaphragm 250, the operator or valve stem 272 will move up, closing the release valve 278 and cutting off further flow of main reservoir air passage 242 to the brakepipe line 124 at feed valve or full release pressure.
CHARGING (Trailing Cab)

Operation of the converter valve 212 and brakepipe control valve 210 on trailing manifolds is identical to that on the lead except that when brakepipe pressure rises to within, for example, 2.0 PSI of feed valve setting, the brakepipe cut-off valve 214 will be de-energized by its local controller 68, stopping the local charging of the brakepipe line 124. Thus preventing slight differences in feed valve settings on the several manifolds in a train from setting up a condition where one part of the train attempts to charge brake pipe while another location discharges it.
BRAKE APPLICATION (Leading Cab)

When the driver wishes to apply the brakes, the leading controller 68 calls for one of the discreet levels of braking and will signal all manifolds to open the brakepipe cutoff valves 214 and to output the required pressure to brakepipe by energizing the appropriate solenoid valves on the converter 212.

At the leading manifold, the solenoid energization pattern will cause the converter valve 212 at each manifold to produce an output pressure proportional to the desired increase in brake effort. This pressure will be transmitted to the reduction control chambers 262 of the brakepipe control valves 210, where it will urge the stem 272 of this valve upward. This action opens the internal brakepipe exhaust or application valve 274, causing brakepipe pressure (and hence the pressure beneath the feed valve diaphragm) to drop in proportion to the increased signal from the converter valve 212.

Since the area of the second or reduction pilot diaphragm 260 is only 28% of that of the first or main diaphragm 650, and since feed valve pressure applied to the reduction chamber 202 will place on the stem 272 in the upward direction 28% of the downward force applied by the feed valve pressure acting on the top chamber 252 of the main diaphragm 250. Thus with the exhaust or application valve 274 opened as described, brakepipe pressure will reduce until the stem 272 balances at a value 72% of feed valve pressure, whatever this pressure may be. For example, a 90 PSI feed valve setting would have a 65 PSI brakepipe pressure at full service reduction.

In the case of a less than full service (level 6 for example), the brake control signal and resulting brake pipe reduction would be in proportion to the brake level called for.
BRAKE APPLICATION (Trailing Cab)

When braking is called for, all manifolds on the train receive the same converter valve energization pattern for the three solenoids, and thus produce the same brake pipe reduction signal to chamber 262 of the control valve 210. On trailing units, however, the local controller 68 looks up the proper brakepipe pressure corresponding to the level command and actual feed valve setting, and de-energizes the brakepipe cut-off valve 214 when actual brakepipe pressure measured by transducer 216 has fallen to within, for example, 2 PSI of this value. This allows brakepipe pressure maintaining to be controlled by the lead manifold only. In the event that surge effects cause brakepipe pressure to rise to a value greater than, for example, 3 PSI above the target, the brakepipe cut-off valve 214 will re-open and assist the lead in maintaining the reduction.

Should brakepipe pressure fall below the target value, however, the brakepipe cut-off valve 214 will not re-open to maintain brakepipe pressure unless the difference is again greater than 2 PSI since this is accomplished from the head end.

Should the driver call for further brakepipe reduction by changing the command signal, the local controller 68 at all manifold locations will all open their respective brakepipe cut-off valves 214 to permit the newly commanded value of brakepipe pressure to be rapidly and simultaneously established at each location on the train.
EMERGENCY BRAKE APPLICATION (Driver Commanded)

When the driver calls for an emergency application, local brakepipe venting at an emergency rate is initiated mechanically by the Master Controller mechanism, and an electrical signal is sent to all controller 68 signalling their respective manifolds to close the brakepipe cut-off valve 214, and open the emergency valve 220. This latter action will trip the pneumatic vent valve 222 on each manifold, thus initiating additional serial venting of the brakepipe 100 to speed up the application of brakes. Dynamic braking will be maintained in effect during an emergency application.
EMERGENCY BRAKE APPLICATION (Break-In-Two)

When the brakepipe is opened by any means other than the Master Controller, serial venting of brakepipe 100 will be initiated by the vent valves 138 and 222. When the vent valve 222 on any manifold trips, the reduction of brakepipe pressure will be noted by the brakepipe feedback transducer 216, which is placed in close proximity to the vent valve 222 so that brakepipe feed from passage 256, will not overcome the ability of the system to note the initiation of an emergency reduction of brakepipe pressure.

When an emergency condition is thus found to exist, the controller 68 communicates this fact to all other controllers 68 and at the same time cuts off brakepipe charging (if in effect) by cutoff valve 214 and opens the local emergency valve 220. This action is repeated by all controllers 68 receiving the electrical emergency signal from whichever location first noted the emergency, thus greatly speeding the application of brakes on the train.

It should be noted that when the train is being towed by conventional equipment, all controls are dead and brakepipe cutoff valves 214 are all closed. Thus, as no air can be fed to the brakepipe from the manifold 202, there is no need for direct pneumatic brakepipe cutoff by cutoff valve 214 to permit towing.

PARKING BRAKE CONTROL

The parking brake relay valve 224 includes a diaphragm 304 whose upper chamber 306 is connected to the brakepipe line 124 by brake line passage 244. The parking brake release valve 226 is a solenoid controlled double seat valve 322 which connects the parking brake release signal passage 320 to either the feed valve passage 246 when de-energized or to atmosphere port 324 when energized. A spring 308 below the diaphragm 304 forces the diaphragm 304 against the brakepipe pressure. An actuator or valve stem 312 interacts with a dual seat valve 314 to connect to the brakepipe release passage 316 either to an atmosphere port 318 or the parking brake release signal passage 320 connected to the parking brake release valve 226.

The parking brake control operation is as follows:

PARKING BRAKE APPLICATION (Operator Controlled)

When service brakes are fully charged and released, the driver may wish to apply parking brakes to hold the train for test purposes. This is accomplished by turning the "Parking Brake" switch on the Master Controller. Thus causing the controller 68 to signal all manifolds to energize their parking brake release valves 226 connecting passage 320 to atmosphere and vent parking brake release pipe 126 to atmosphere. This vents the spring brake chambers 130 on the individual trucks and the spring applies the parking brakes.

PARKING BRAKE RELEASE (Operator Controlled)

To release the parking brake once brakepipe 100 is charged, the driver turns the parking brake switch to release, signalling all controllers 68 to de-energize their parking brake release valves 226. This permits feed valve air on passage 246 to pressurize the parking brake release pipe 126 which is connected from each manifold to the motorized trucks. At the individual trucks, this pressure fills the spring brake actuators 130, compressing their application springs and releasing the parking brakes.

PARKING BRAKE APPLICATION (Automatic)

When brake pipe pressure falls below 30 PSI for any reason, the relay valve 224 switches to automatic application position (shown) cutting off the supply of feed valve on passage 320 to the parking brake release pipe 126, and connecting this pipe 126 to atmosphere at 316. This enables automatic parking brake application. At the individual truck locations, brake cylinder pressure is double checked 128 into the spring chambers, holding them released if normal brakes are applied, as they should be at low brake pipe pressure.

In this condition, if after a period of time the brake cylinder pressure falls off due to leakage, spring chamber pressure will be lost and as the service brake becomes less effective, the spring parking brake will automatically take over maintaining the train safely held from motion.

PARKING BRAKE RELEASE (Automatic)

When brakepipe pressure is restored, whether from a towing conventional train or from restarting a shut down train, brakepipe pressure will come up and, with the control valve 104, so will service brake cylinder 118 pressure. When brakepipe pressure rises above 30 PSI, the parking brake release relay valve 224 will switch and re-establish communication with the parking brake release valve 226. Thus driver control of the parking brake by the controller 68 is restored.

PARKING BRAKE OPERATION (Dead in Tow)

Automatic operation of the parking brake remains unchanged from that described above when the integral train is being towed by a conventional train. It is only necessary to connect the conventional train's brake pipe hose to that on the adapter coupler and release brakes in the conventional manner. Charging brakepipe 100 via 124 will charge the main reservoir system through the manifold mounted charging choke 240 and check vane 238, providing a source of feed valve pressure to the parking brake release circuit. When brakepipe pressure rises above 30 PSI, the parking brake relay 224 will connect the parking brake release pipe 126 to this circuit. Thus, air at brake pipe pressure will flow through the feed valve 204, parking brake release valve 226, and the parking brake relay 224 to the parking brake release pipe 126. When brake pipe pressure has risen sufficiently to release the service brakes 118, the spring brake chambers 130 will be charged and parking brakes will release as well.

When the integral train has been moved by conventional equipment to a desired location, the air brakes should be set in emergency. This will switch the parking brake relay 224, venting the parking brake release pipe 126 at all manifolds and permitting the spring brake 130 to apply as cylinder pressure is lost on the individual trucks. This provides the same or better protection as an applied handbrake on conventional equipment would.

RETARDER CONTROL

The motorized cars are each equipped with a hydraulic brake such as a hydraulic retarder or an eddy current brake 59 working on the traction motor input shaft to the transmission 60 to achieve dynamic braking. Control of retardation effort is extremely simple, requiring only that the pneumatic retarder pipe 132 be charged to a pressure proportional to brake effort desired. The controller 68 will call for three levels of retarder pipe pressure to be maintained very roughly at plus or minus 15% of nominal pressure. If a calculation by the central traction computer shows that full retarder control pipe pressure (or the calculated maximum allowable pressure) will not produce the desired retardation, then a further service brake application sufficient, when combined with retarder action, to produce the commanded result, will be made. On powered cars only, the brake cylinder pressure inhibit or interlock valve 136 is interposed between the control valve 210 and brake cylinder pipe 112. The interlock valve 136 suppresses brake cylinder supply by an amount proportional to retarder control pipe pressure so as to prevent overbraking and wheelslip on powered axles.

The manifold's retarder control group 230 retard application valve 234 admits air to the retarder pipe 132 via retard passage 236 until the controller 68 terminates charging, based on information from the retarder pipe transducer 236, at the charging high level of the retarder pipe dead band. If after termination of charging, retarder pipe pressure falls below the charging band's low level, the application valve 234 will be opened once again.

When the driver changes brake call, or the automatic blending program requires it, the controller 68 may call for a change in retarder level. When this necessitates reducing the retarder pipe level, the retarder release valve 232 is opened by the controller 68 and retarder pipe pressure is vented to atmosphere until the upper discharge dead band limit is reached, where discharge is terminated and both retarder pipe control valves 232 and 234 are lapped.

Although the present invention has been described and illustrated in detail, it is to be clearly understood that the same is by way of illustration and example only, and is not to be taken by way of limitation. The brakepipe control system, parking brake control system and retard control systems have been described in combination to achieve the object of the invention. These systems may be used individually. The spirit and scope of the present invention are to be limited only by the terms of the appended claims.

What is claimed:

1. An electropneumatic brake control system for rail vehicles interconnected by a brakepipe and including at least one brakepipe control system comprising:

control valve for controlling pressure on said brakepipe in response to a pneumatic brake control signal;

cutoff valve connecting said control valve to said brakepipe;

converter valve for converting digital values of electrical brake signals to discrete pneumatic brake control signals for said control valve; and control means for providing said digital electrical brake signals which control brakepipe pressure.

2. An electropneumatic brake control system for rail vehicles interconnected by a brakepipe, at least two vehicles each include a brakepipe control system comprising:

control valve for controlling pressure on said brakepipe in response to a first pressure signal and a pneumatic brake control signal;

cutoff valve connecting said control valve to said brakepipe;

converter valve for converting electrical brake signals to pneumatic brake control signals for said control valve;

first and second transducers for measuring said first pressure signal and brakepipe pressure respectively; and control means for providing said electrical brake signals to said converter valve and controlling said cutoff valve in response to the difference of said measured first pressure signal and measured brakepipe pressure to control brakepipe pressure.

3. A system according to claim 2, wherein said control means of a second brakepipe control system controls its cut off valve to close at a difference greater than a difference that said control means of a first brakepipe control system closes its cutoff valve.

4. A system according to claim 2, wherein said control valve includes a first pressure sensitive means which compares brakepipe pressure to said first pressure signal to maintain said the brakepipe at a first pressure value, and a second pressure sensitive means is connected to said first pressure sensitive means to reduce the effect of said first pressure signal in response to said pneumatic brake control signal.

5. A system according to claim 4, wherein said pneumatic brake control signal varies in a range from zero to said first pressure signal and a ratio of response of said first and second pressure sensitive means defines brakepipe service braking pressure range.

6. A system according to claim 2, including a feed valve for determining said first pressure signal.

7. An electropneumatic brake control system for rail vehicles interconnected by a brakepipe and including at least one brakepipe control system comprising:

control valve for controlling pressure on said brakepipe in response to a pneumatic brake control signal and including a first pressure sensitive means responsive to a first pressure signal and brakepipe pressure to maintain the brakepipe at a first pressure value and a second pressure sensitive means responsive to said pneumatic brake control signal to reduce said brakepipe to discreet pressure values below said first pressure value;

converter valve for converting electrical brake signals to pneumatic brake control signals for said control valve; and control means for providing said electrical brake signals which control brakepipe pressure.

8. A system according to claim 7, wherein said first pressure sensitive means compares brakepipe pressure to said first pressure signal, and said second pressure sensitive means is connected to said first pressure sensitive means to reduce the effect of said first pressure signal in response to said pneumatic brake control signal.

9. A system according to claim 7, including a feed valve for determining said first pressure signal.

10. A system according to claim 7, wherein said pneumatic brake control signal varies in a range from zero to said first pressure signal and a ratio of response of said first and second pressure sensitive means defines brakepipe service braking pressure range.

11. An electropneumatic brake control system for rail vehicles interconnected by a brakepipe and including at least one brakepipe control system comprising:

control valve for controlling pressure on said brakepipe in response to a pneumatic brake control signal;

cutoff valve connecting said control valve to said brakepipe;

converter valve for converting electrical brake signals to pneumatic brake control signals for said control valve;

electropneumatic emergency vent valve connected to said brakepipe; and control means for providing said electrical brake signals to said converter valve and controlling said cutoff valve to close and said electropneumatic emergency vent valve to open for an emergency braking to control brakepipe pressure.

12. A system according to claim 11, including a pneumatic emergency vent valve connected to and responsive to an emergency brake pressure in said brakepipe to vent said brakepipe.

13. A system according to claim 11, including a transducer for sensing an emergency brake pressure in said brakepipe and said control means controls said cutoff valve and said electropneumatic emergency vent valve in response to an emergency input from said transducer or an emergency input from an operator.

14. An electropneumatic brake control system for rail vehicles interconnected by a brakepipe and including at least one brakepipe control system comprising:

control valve for controlling pressure on said brakepipe in response to a pneumatic brake control signal;

converter valve for converting electrical brake signals to pneumatic brake control signals for said control valve;

a retarder valve connected to a retarder actuator on a driven car for providing pneumatic retarder signals to operate said retarder actuator for dynamic braking;

an interlock valve in a brake cylinder pneumatic circuit of said driven cars and responsive to said retarder signals to proportionally reduce brake cylinder pressure; and control means for providing said electrical brake signals which control brakepipe pressure and controlling said retarder actuator.

15. An electropneumatic brake control system for rail vehicles interconnected by a brakepipe and comprising:

a first brakepipe control system including
control valve for controlling pressure on said brakepipe in response to a pneumatic brake control signal,
cutoff valve connecting said control valve to said brakepipe;
converter valve for converting electrical brake signals to pneumatic brake control signals for said control valve and
control means for providing said electrical brake signals which control brakepipe pressure; and a second brakepipe control system including
second control valve,
second cutoff valve,
second converter valve,
first and second transducers for measuring a first pressure signal provided to said second control valve as a reference and a brakepipe pressure respectively, and
second control means for controlling said second cutoff valve to close at a difference between said measured first pressure signal and measured brakepipe pressure.

16. An electropneumatic brake control system for rail vehicles interconnected by a brakepipe and including at least one brakepipe control system comprising:

control valve for controlling pressure on brakepipe in response to a pneumatic brake control signal;

cutoff valve connecting said control valve to said brakepipe;

converter valve having a plurality of valving elements responsive to digital values of electrical brake signals for converting said digital values of electrical brake signals to discrete pneumatic brake control signals for said control valve; and control means for providing said digital electrical brake signals which control brakepipe pressure.

17. An electropneumatic brake control system for rail vehicles interconnected by a brakepipe and including at least one brakepipe control system comprising:

control valve for controlling pressure on said brakepipe in response to a pneumatic brake control signal;

cutoff valve connecting said control valve to said brakepipe;

converter valve for converting electrical brake signals to pneumatic brake control signals for said control valve;

control means for providing said electrical brake signals which control brakepipe pressure; and a pneumatic parking brake valve responsive to said brakepipe for applying and releasing a parking brake; and an electropneumatic parking brake valve connected to said parking brake by said pneumatic parking brake valve and controlled by said control means to apply and release said parking brake.

* * * * *